United States Patent
Caselli et al.

(10) Patent No.: US 11,339,576 B2
(45) Date of Patent: May 24, 2022

(54) FLOOR ELEMENT FOR FORMING A FLOOR COVERING AND A FLOOR COVERING

(71) Applicant: Daltile Corporation, Dallas, TX (US)

(72) Inventors: Claudio Caselli, Dallas, TX (US); Rahul Patki, Richardson, TX (US)

(73) Assignee: Daltile Corporation, Dallas, TX (US)

( * ) Notice: Subject to any disclaimer, the term of this patent is extended or adjusted under 35 U.S.C. 154(b) by 0 days.

(21) Appl. No.: 16/573,138

(22) Filed: Sep. 17, 2019

(65) Prior Publication Data

US 2021/0079666 A1   Mar. 18, 2021

(51) Int. Cl.
| | | |
|---|---|---|
| *E04F 15/02* | (2006.01) | |
| *E04F 15/08* | (2006.01) | |
| *B32B 18/00* | (2006.01) | |
| *B32B 27/30* | (2006.01) | |
| *B32B 7/12* | (2006.01) | |

(52) U.S. Cl.
CPC .............. *E04F 15/087* (2013.01); *B32B 7/12* (2013.01); *B32B 18/00* (2013.01); *B32B 27/304* (2013.01); *E04F 15/02038* (2013.01); *B32B 2419/04* (2013.01); *E04F 15/02016* (2013.01); *E04F 2201/023* (2013.01); *E04F 2201/043* (2013.01)

(58) Field of Classification Search
CPC ... E04F 15/02038; E04F 15/02; E04F 15/105; E04F 15/107; E04F 2201/0153
See application file for complete search history.

(56) References Cited

U.S. PATENT DOCUMENTS

| | | | |
|---|---|---|---|
| 2,215,975 A | * | 9/1940 | Rackle ...................... E04B 5/06 52/440 |
| 3,521,418 A | | 7/1970 | Lawrence |
| 3,646,180 A | | 2/1972 | Winnick |
| 3,817,012 A | | 6/1974 | Clark et al. |
| 4,415,616 A | | 11/1983 | Angioletti |

(Continued)

FOREIGN PATENT DOCUMENTS

| | | |
|---|---|---|
| EP | 2369090 B1 | 9/2011 |
| EP | 3404165 A1 | 11/2018 |

(Continued)

OTHER PUBLICATIONS

Oprea, "Effects of Fillers on Polyurethane Resin-based Polyurethane Elastomeric Bearing Materials for Passive Isolation," Journal of Composite Materials 2008 42:2673.

(Continued)

*Primary Examiner* — Brent W Herring
*Assistant Examiner* — Daniel J Kenny
(74) *Attorney, Agent, or Firm* — Troutman Pepper Hamilton Sanders LLP; James E. Schutz; Chris N. Davis

(57) ABSTRACT

A floor element for forming a floor covering, wherein the floor element comprises a decorative layer, a support layer, and an intermediate layer disposed between the decorative layer and the support layer, wherein the decorative layer is made of a brittle material, wherein the floor element comprises edges provided with coupling elements adapted to cooperate with coupling elements of an adjacent similar floor element in said floor covering and wherein the intermediate layer comprises at least one edge that is offset relative to a respective edge of the decorative layer.

13 Claims, 3 Drawing Sheets

(56) References Cited

U.S. PATENT DOCUMENTS

| | | | |
|---|---|---|---|
| 4,567,704 A | 2/1986 | Bernett | |
| 4,621,001 A | 11/1986 | Bard | |
| 4,681,786 A | 7/1987 | Brown | |
| 4,717,695 A | 1/1988 | Oda | |
| 4,832,995 A | 5/1989 | McLauchlin | |
| 5,906,082 A | 5/1999 | Counihan | |
| 5,937,612 A | 8/1999 | Winer et al. | |
| 6,413,618 B1 | 7/2002 | Parker et al. | |
| 6,818,275 B2 | 11/2004 | Guarda et al. | |
| 7,393,583 B1 | 7/2008 | Warren | |
| 7,866,636 B1 * | 1/2011 | Hansen | E04F 11/1851 256/65.14 |
| 7,993,731 B2 | 8/2011 | Miller et al. | |
| 8,585,859 B2 * | 11/2013 | Renius | F16B 11/006 156/305 |
| 9,611,659 B2 * | 4/2017 | Baert | E04F 13/077 |
| 9,896,581 B2 | 2/2018 | Morizur | |
| 10,875,623 B2 * | 12/2020 | Hu | B64C 1/18 |
| 2004/0031225 A1 | 2/2004 | Fowler | |
| 2004/0031226 A1 | 2/2004 | Miller et al. | |
| 2004/0229020 A1 * | 11/2004 | LaBorde | E04F 15/02016 428/192 |
| 2004/0255541 A1 | 12/2004 | Theirs et al. | |
| 2006/0111002 A1 | 5/2006 | Rodrigues | |
| 2006/0159900 A1 * | 7/2006 | Miller | B32B 21/14 428/212 |
| 2007/0163194 A1 | 7/2007 | Stone | |
| 2007/0220822 A1 | 9/2007 | Permesang | |
| 2007/0289236 A1 | 12/2007 | Choi | |
| 2008/0041008 A1 | 2/2008 | Pervan | |
| 2008/0092473 A1 | 4/2008 | Heyns | |
| 2009/0041987 A1 | 2/2009 | Schitter | |
| 2009/0155612 A1 | 6/2009 | Pervan et al. | |
| 2010/0018149 A1 | 1/2010 | Theirs | |
| 2010/0154339 A1 | 6/2010 | Boyadjian et al. | |
| 2010/0022948 A1 | 9/2010 | Wallin | |
| 2011/0154665 A1 | 6/2011 | Pervan et al. | |
| 2011/0239572 A1 | 10/2011 | Calapkulu | |
| 2011/0302855 A1 | 12/2011 | D'Agostino | |
| 2012/0100332 A1 | 4/2012 | Yu et al. | |
| 2012/0317911 A1 | 12/2012 | Huang | |
| 2013/0014891 A1 | 1/2013 | Vandevoorde et al. | |
| 2013/0097950 A1 | 4/2013 | Hunsaker et al. | |
| 2013/0104485 A1 | 5/2013 | Meersseman et al. | |
| 2014/0318070 A1 | 10/2014 | Schacht et al. | |
| 2014/0349084 A1 | 11/2014 | Patki et al. | |
| 2015/0121793 A1 | 5/2015 | Segaert et al. | |
| 2016/0288447 A1 | 10/2016 | Cordeiro | |
| 2018/0006598 A1 * | 1/2018 | Bunea | H02S 30/10 |
| 2018/0258651 A1 | 9/2018 | Meersseman et al. | |
| 2020/0063443 A1 * | 2/2020 | Boucke | B32B 27/22 |
| 2020/0141129 A1 | 5/2020 | Patki et al. | |

FOREIGN PATENT DOCUMENTS

| | | |
|---|---|---|
| JP | 2012026260 A | 2/2012 |
| KR | 20110064350 A | 6/2011 |
| WO | 2004097141 A1 | 11/2004 |
| WO | 2008097860 A2 | 8/2008 |
| WO | 2009142365 A | 11/2009 |
| WO | 2010072704 A1 | 7/2010 |
| WO | 2011150076 A1 | 12/2011 |
| WO | 2017013501 | 1/2017 |
| WO | 2018211397 A1 | 11/2018 |

OTHER PUBLICATIONS

Gil, "Cork Composites: A Review," Materials Sep. 2009; 2(3): 776-789.

International Search Report and Written Opinion for International Application No. PCT/US2020/050613 dated Dec. 17, 2020.

\* cited by examiner

FLOOR ELEMENT FOR FORMING A FLOOR COVERING AND A FLOOR COVERING

BACKGROUND

1. Technical Field

The present invention relates to a floor element for forming a floor covering and a floor covering.

More particularly, the invention is related to a floor element, wherein this floor element comprises a decorative layer comprising a ceramic tile to be installed in a floating manner. Floating installation is a type of installation in which the floor element is not glued on the subfloor. In particular, the invention is related to a floor element that further comprises a support layer having edges provided with coupling elements adapted to cooperate with coupling elements of an adjacent similar floor element.

2. Background

Examples of said floor elements are shown in WO 2004/097141, WO 2008/097860. Since floating does not provide a solid bonding to the subfloor, the ceramic tile is susceptible to impact breaking. Moreover, the higher flexibility of the floor covering reduces the fatigue strength of the covering, especially in correspondence of the joints between the tiles that is usually filled with a grout for impermeability of the covering. Document WO 2018/211397 proposes a solution to improve the impact resistance of the and fatigue strength of the floor element.

Usually, as in traditional installations, a grout fills an intermediate space between the edges of the decorative layer to provide impermeability to the floor covering. In floating installations, the covering can be more prone to fatigue break in particular in correspondence of the grout joints.

The present invention aims in the first place to provide an alternative floor element, which, in accordance with several of its preferred embodiments, is directed to solve one or more of the problems arising in the state of the art.

BRIEF SUMMARY OF THE INVENTION

In a first aspect, the invention provides a floor element for forming a floor covering, wherein the floor element comprises a decorative layer, a support layer, and an intermediate layer disposed between the decorative layer and the support layer, wherein the decorative layer is made of a brittle material, wherein the floor element comprises edges provided with coupling elements adapted to cooperate with coupling elements of an adjacent similar floor element in the floor covering, and wherein the intermediate layer comprises at least one edge that is offset relative to a respective edge of the decorative layer.

In another aspect, the invention provides a floor covering comprising a plurality of adjacent floor elements, wherein each floor element comprises a decorative layer of ceramic material, a support layer disposed below the decorative layer, and an intermediate layer in between the decorative layer and the support layer, wherein the intermediate layer comprises at least one edge that is offset relative to a respective edge of the decorative layer, wherein the adjacent floor elements further comprise coupling means configured to enable a mechanical coupling with coupling elements of adjacent floor elements, and wherein the floor covering comprises a grout filling an intermediate distance separating the decorative layers of the floor elements.

In another aspect, the invention provides a floor covering comprising a plurality of floor elements, wherein the floor elements comprise a decorative layer comprising a ceramic material, a support layer disposed below the decorative layer, and an underlayer made of a compressible material, wherein the floor elements further comprise coupling means configured to enable a mechanical coupling with coupling elements of adjacent floor elements.

These and other objects, features and advantages of the present invention will become more apparent upon reading the following specification in conjunction with the accompanying description, claims and drawings.

BRIEF DESCRIPTION OF THE FIGURES

The accompanying Figures, which are incorporated in and constitute a part of this specification, illustrate several aspects described below.

DETAILED DESCRIPTION OF THE INVENTION

Figure 1:
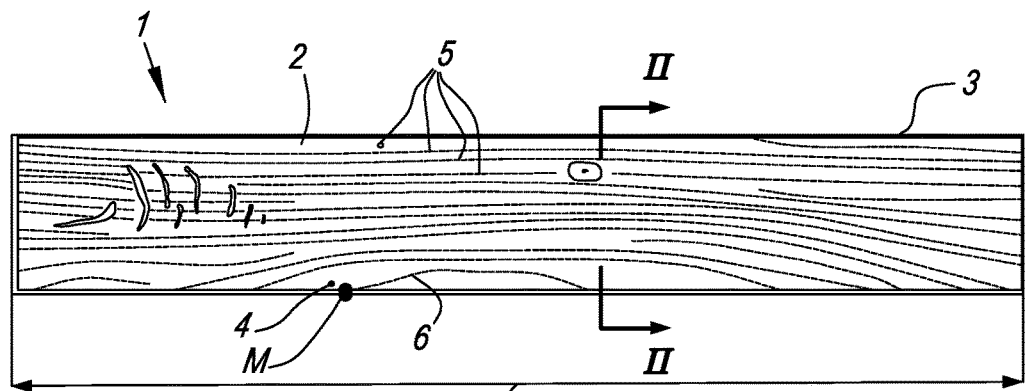
FIG. 1 shows a top view of a floor element of the invention.

Thereto, the present invention, according to a first independent aspect, relates to a floor element for forming a floor covering, wherein the floor element comprises a decorative layer and a support layer, wherein the decorative layer is made of a brittle material, wherein the floor elements comprises edges provided with coupling elements adapted to cooperate with coupling elements of an adjacent similar floor element in said floor covering and wherein the floor element comprises an intermediate layer disposed between the decorative layer and the support layer, whit the characteristic that the intermediate layer comprises at least one edge that is offset relative to a respective edge of the decorative layer. Preferably said edge of the intermediate layer projects inwardly with respect to the respective edge of the decorative layer. By turning the point of view, preferably, the edge of the decorative layer extends beyond the respective edge of the intermediate layer. In this context "respective edge" refers to the closer edge. For example, the intermediate layer and the decorative layer may have a similar or equal shape, preferably rectangular, and the expression "respective edge" refers to the edge of one layer that is closer, and for example substantially parallel, to a reference edge of the other layer. In this way an empty space between the decorative layer and the support layer that, in the installed configuration, can be at least partially filled by a grout so that the interaction between the floor element and the grout can be improved to increase the fatigue strength of the floor covering. Moreover, the inventors have found that even in case the grout does not fill said empty space it makes more rigid the connection between the edges of adjacent decorative layer thereby providing a beneficial effect to local strength in correspondence of the edge. This can happen for example when said empty space is too thin and/or when the grout used is particularly viscous. Preferably a plurality, for example all, the edges of the intermediate layer are offset relative to a respective edge of the decorative layer.

Preferably, the intermediate layer covers a portion of the lower surface of the decorative layer, for example the majority, i.e. at least 50 percent, of the lower surface of said decorative layer. More preferably, the resin covers 80 percent or more of the lower surface of the decorative layer. According to the invention the intermediate layer covers less than 100 percent. For example, the intermediate layer covers a portion of the lower surface of the decorative layer comprised between 80 and 100%, preferably between 90 and 95%. It is also preferred that the intermediate space covers a central portion of the lower surface of the decorative layer leaving free a perimetral portion thereof.

According to an embodiment of the invention, the intermediate layer can have a substantially the same shape of the decorative layer, for example the edges of the intermediate layer are substantially parallel to the edges of the decorative layer. According to a preferred embodiment, the intermediate layer has a substantially irregular shape.

The intermediate layer is configured to bond together the decorative layer and the support layer and/or improve the impact strength of the decorative layer.

In a first preferred embodiment, the intermediate layer preferably comprises an adhesive or a resin that bonds together the decorative layer and the support layer. According to this first preferred embodiment, the decorative layer comprises a resin and more preferably it is substantially made of that resin. For example, the resin is a thermosetting resin or thermoplastic resin. Examples of thermosetting resin are epoxy, polyurethane, unsaturated polyester, vinyl ester, cyanoacrylate. Examples of thermoplastic resin are hot melt, polyester thermoplastic, acrylic resin, vinyl etc. Said resin can be provided according to several possibility a non-exhaustive list of which is hereby enclosed.

In a first possibility, the resin is fluid in the uncured state, so that it can permeate a lower surface of the decorative for providing a reinforcing effect. According to this possibility, the resin may comprise a viscosity less than 1000 Pas, preferably less than 800 Pas, more preferably less than 600 Pas, for example approximately 400 Pas at 20° C. The resin may have a viscosity greater than 1 Pas, and preferably greater than 10 Pas, for example greater than 100 Pas at 20° C. The resin may have a viscosity between 1 Pas and 1000 Pas at 20° C., including between 10 Pas and 1000 Pas at 20° C. Within the scope of the invention viscosity means the viscosity of the uncured resin, for example the viscosity of the mixture of the two components before the completion of the curing, i.e. during the so-called pot life. According to this first possibility the resin may be free from fillers, like mineral fillers. In fact, the inventors have found that the presence of fillers if on one hand improves mechanical properties of the resin as such, on the other hand increases the viscosity of the resin thereby forming an obstacle to the permeation of the decorative layer In a second possibility, the resin is in a viscous state, for example in a pasty or gel state, in this case it can also show a thixotropic behavior. According to this possibility, the resin may comprise a viscosity greater than 1000 Pas, preferably greater than 1200 Pas, more preferably greater than 1400 Pas, for example approximately 1500 Pas at 20° C. The resin may have a viscosity greater than 1800 Pas, preferably greater 2000 Pas, for example 2200 Pas at 20° C. The resin may have a viscosity between 1000 Pas and 2200 Pas at 20° C., including between 1500 Pas and 2200 Pas at 20° C. This feature, first of all provides a resin that is easier to apply on the back of the decorative layer, moreover generally to thicker resin correspond a more rigid cured or solidified and this rigidity provides the reinforcing effect to the decorative layer. It is also to be noted that this second possibility is preferably the case when thermoplastic resins are used, in fact viscosity of thermoplastic resins decreases as the temperature increases. According to this first possibility the resin may comprise fillers to improve mechanical properties of the resin.

In both the first and the second possibility, the resin may also show a shrinkage, after curing, comprised between 0.5 and 15%, for example between 1 and 10%. The inventors have surprisingly found that a resin showing this characteristic during its curing retires significantly. Since during curing the resin is the only component of the floor element that shrinks, it compresses the decorative layer disposed above thereby reinforcing the decorative layer itself. According to an embodiment of the invention, upon this compressive effect the planarity deviation of the floor element after gluing is at least 1%, preferably at least 5%, for example at least 10% higher than the planarity deviation of the decorative layer before gluing.

In both the first and the second possibility, the resin preferably comprises a tensile strength between 50 and 90 MPa, more preferably between 60 and 80 MPa, for example 75 MPa. It is noted that the resin preferably comprises a compressive strength between 90 and 130 MPa, more preferably between 100 and 120 MPa, for example 110 MPa. The inventors have found that such strength is sufficient to provide a rigid matrix for the composite polymer-ceramic layer that allows dissipation of the impact energy. It is also noted that the resin may preferably show a hardness value of at least 50 measured on a Shore D scale. In fact, the inventors have found that a rigid resin, rather than flexible resin, improves the transfer of the impact energy between the layers.

It is not excluded that the resin can comprise a hardness value less than 50 measured on a Shore D scale, and/or a tensile strength less than 50 MPa and/or a compressive strength less than 90 MPa. In fact, a softer and more elastic resin can provide a dampening effect in reaction to an impact on the decorative layer.

The resin is preferably provided onto the lower surface of the decorative layer in an amount greater than 100 g/sqm, more preferably greater than 250 g/sqm, for example 200 g/sqm. It is to be noted that the feature that the edge of the intermediate layer is offset relative to a respective edge of the decorative layer permits to reduce the amount of resin used thereby reducing a risk of overflow of the resin beyond the edges of the decorative layer, and reducing the cost of the intermediate layer.

According to a second preferred embodiment, the intermediate layer may comprise a metal plate, for example a steel or aluminum plate. Preferably, the metal plate is configured to establish a compressive state in the decorative layer. In this way, since the decorative layer is in a compressive state, the impact resistance is strongly improved, because the compression obstacles the propagation of cracks and helps in disguising the visual effect of superficial cracks. To achieve this goal, the metal plate is first stretched, for example by means of a mechanical or thermal stretching, and then is bonded to the decorative layer while the metal plate is in the stretched state. Subsequently, the stretch is released, by interrupting the mechanical solicitation or by cooling the metal plate itself, thereby establishing a compressive state in the decorative layer. Therefore, the metal plate preferably compresses the decorative layer. For example, embodiment, the metal plate has a coefficient of thermal expansion higher than the coefficient of thermal expansion of the decorative layer. Due to this solution, the reinforcing element is heated to a stretched state, and then it is bonded to the decorative layer while it is still in the stretched state and subsequently it is cooled down to retract and put the decorative layer in compression. The metal plate preferably comprises a thickness less than 1 mm, for example less than 0.5 mm, more preferably less than 0.3 mm. For example, the metal plate has a thickness between 0.1 mm and 0.3 mm.

According to this second preferred embodiment, the intermediate layer comprises a glue or resin to bond together the metal plate with the decorative layer and/or the support layer. In this case the resin can be a thermosetting resin are epoxy, polyurethane, unsaturated polyester, vinyl ester, cyanoacrylate. Examples of thermoplastic resin include but are not limited to hot melt, polyester thermoplastic, acrylic resin, vinyl etc. Preferably the adhesive is a polyurethane resin having a temperature activated curing, so that the adhesive can be applied onto the decorative layer and/or the metal plate in a heated state to activate curing of the adhesive. Preferably the adhesive is provided on both the opposite faces of the metal plate to bond it to the decorative layer and to the support layer. The same adhesive can be provided on the two faces of the metal plate or alternatively two different adhesives can be provided on the opposite faces respectively. The metal plate and/or the decorative layer, and/or the support layer can comprise a primer coating to improve adhesion efficiency of the adhesive.

The decorative layer can be made of any kind of hard or brittle material, such as ceramic, natural stone, concrete, glass or glass-ceramic material. Said brittle materials show high wear resistance, impermeability and cleanability. The term brittle material includes a material that breaks without significant plastic deformation. In particular, for the scope of said patent application, the term brittle material includes a material that of its own (if not bonded to a support layer and without any reinforcing element) has an impact strength lower than 1.68 J (corresponding to a ball falling from a height lower than 762 mm) according to the ball impact test described herein. Impact strength for flooring can be determined by means of a steel ball impact test. According to this test the impact strength is measured by dropping a steel ball on the floor element from a certain height, if the floor element does not break the height is increased until a height is reached where the steel ball breaks the floor element. The steel ball has a weight of 225.5 grams and a diameter of 38.1 mm (1.5 inches). The impact strength is expressed in terms of the maximum attainable height from which the steel ball, when dropped on the floor element does not break the floor element. The higher the drop height, the higher is the impact strength. The impact strength can be expressed in Joule (J), i.e. the energy of the steel ball when hitting the surface of the floor element.

According to a preferred embodiment, the decorative layer comprises a ceramic body, for example made of porcelain, red body ceramic, stoneware, earthenware, or other sintered ceramic powders. Preferably, the decorative layer is a ceramic tile or slab. The term "ceramic tile" includes an element with a substantially flat body consisting of baked minerals, such as clay, and preferably with a fired decorative top surface, preferably but not necessarily, on the basis of a glaze. The glaze has also the effect of preventing the resin permeating the decorative layer from reaching the upper surface of the decorative layer thereby affecting the appearance of the floor element.

According to an embodiment of the invention, the decorative layer may comprise, at least in correspondence of its lower surface, an open porosity. For example, the decorative layer can comprise an apparent porosity between 0.1% and 10% determined according to ASTM C373, more preferably between 2% and 8%, for example 6%. Said apparent porosity can be lower than 15%, preferably lower than 10% measured according to ASTM C373. Furthermore, the decorative layer may have a volume of the open pores comprised between 0.01 cc (cubic centimeter) and 1 cc, more preferably between 0.10 cc and 0.90 cc, for example 0.60 cc.

In a preferred embodiment of the invention, the decorative layer comprises a lower surface that is substantially flat. The lower surface is the non-visible surface (in use) that is opposite to the upper decorative surface of the decorative layer. Usually, the lower surface of a ceramic tile comprises a structure, for example formed from ribs or excavations, that can have a thickness up to 2 or 3 mm, but the inventors have found it is preferred to use a decorative layer that is free from said structure. Furthermore, in an embodiment of the invention the lower surface of the decorative layer, in particular of the ceramic tile, can be free from backwash. The backwash is a thin, often non uniform, coating basically comprising an engobe that is applied to the lower surface of the ceramic tile and has the function of preventing the material of the non-fired ceramic tile from sticking onto the rollers of the firing kiln. It is also possible that the backwash covers a portion of the lower surface of the decorative layer that is less than 20%, preferably less than 10% of said lower surface.

The decorative layer has an upper face comprising a décor. The décor can be provided with a variety of textures, designs and colors. In a preferred embodiment, the décor simulates a natural product, such as natural stone or wood. Preferably, the décor is at least partially formed by a print. The print is preferably realized by means of digital printing, such as inkjet printing, although screen printing, rotogravure, flexography or off-set printing is not excluded. In an embodiment, the décor is at least partially formed by uniformly colored base material or by a mix of colored base materials. The decorative layer can further comprise one or more coating covering at least partially its upper surface. For example, said coating can be a background coating adapted to receive the décor on its top, and/or a protective coating covering at least partially its upper surface and, for example, being adapted to be placed above the décor, preferably being transparent or translucent. In the case that the decorative layer is made of a ceramic material, said coating comprise at least a glaze, an engobe and/or a grit.

It is noted that the decorative layer may comprise a density, expressed by surface weight, of at least 10 kg/sqm, preferably 15 kg/sqm, for example at least 19 kg/sqm. High density of the decorative layer may improve installation of the floor covering and in particular a vertical locking of between the floor elements as described below in more detail. It is also preferred that the decorative layer comprises a density as expressed by surface weight of less than 35 kg/sqm, preferably less than 30 kg/sqm, for example less than 25 kg/sqm. In fact, an excessively heavy decorative layer may affect the maneuverability of the floor element as well as complicating the packaging and the transportation thereof.

The decorative layer can be made of any shape, for example a squared, rectangular or hexagonal shape. In a preferred embodiment, the floor elements are rectangular and oblong in shape, and are preferably provided with a wood grain or stone print depicting wood grain lines or stone veins extending globally in the longitudinal direction of the rectangular decorative layer. In the cases where the decorative layer is formed by one or more ceramic tiles, both unrectified tiles and rectified tiles may be selected, wherein unrectified tiles are preferred since they are less expensive than the rectified ones.

Preferably, the decorative layer has a thickness comprised between 4 and 15 mm, for example greater than 6 mm, preferably greater than 7 mm, for example about 8 or about 10 mm.

Moreover, the decorative layer, especially in the case that is made of a ceramic material, may be slightly bowed. This causes unevenness of the floor covering in case of traditional installation too. Said unevenness is enhanced in case of offset installation of the tile, in fact, tile manufacturers advise against 50/50 offset installation, where an extremal portion of a tile is beside the midpoint of another tile, and suggest a 60/30, that means flank one third of a tile to two thirds of an adjacent tile. Therefore, according to a preferred embodiment, the decorative layer comprises a planarity deviation less than 1.5 mm, preferably less than 1 mm, even more preferably less than 0.8 mm. Within the context of the present application, the planarity deviation is defined as the vertical height difference between the extremal portion and the central portion of an edge of the decorative layer. In particular within the scope of the present invention the planarity deviation is measured by placing the extremes of one edge of the decorative layer, on a horizontal plane and measuring the distance between the middle of the edge from that horizontal plane. Furthermore, within the context of the present application the planarity deviation is preferably measured considering the lower surface of the decorative layer. In fact, the support layer glued below the decorative layer acquires at least the same planarity deviation.

According to a preferred embodiment of the invention, the support layer is made of a material that is different from the material of the decorative layer. More particularly, the support layer is preferably made of a material adapted to be provided with coupling elements and/or made of a waterproof material and/or made of a compressible material.

According to a preferred embodiment, the support layer is preferably made of a polymeric material, more preferably a thermoplastic polymeric material. It is to be noted that the term "preferably made of a polymeric material" does not necessarily mean that the support layer is made exclusively by a polymeric material. In particular, it is not excluded that the support layer can comprises fillers like fibers, strands, whiskers or particles, made of polymeric or non-polymeric material. Moreover, it does not necessarily mean that the polymeric material represents the majority of the material in the support layer, e.g. more than 50% in weight. The expression generally means that the polymeric material represents the matrix surrounding and binding together said filler.

Preferred examples of thermoplastic material are PVC (polyvinyl chloride), polypropylene (PP) or polyurethane, more particularly thermoplastic polyurethane. Preferably, said thermoplastic polymeric material has a glass transition temperature (Tg) less than 100° C. Forming the support layer out of a material with a relatively low glass transition temperature leads to a support layer which is easily compressed at room temperature. Compression is desirable in many respects. For example, a possible thermal expansion of the support layer may be partially or wholly suppressed by the more rigid or stiffer decorative layer and/or reinforcing element that holds the material of the support layer in its original dimension. Compression is also interesting for the design of the coupling elements and allows for a certain adaptation to unevenness of the subfloor, which in its turn prevents air chambers in between the support layer and the subfloor that may amplify walking noises.

Preferably, the support layer is made of PVC, more preferably either of a rigid or of a flexible PVC, wherein rigid PVC comprises an amount of plasticizer lower than 15 phr, and flexible PVC comprises an amount of plasticizer of 15 phr or higher, preferably more than 20 or more than 25 phr. Within the context of the present description, "rigid" means that the support layer, taken alone, bends under the own weight thereof less than 10 cm per meter and still better less than 5 cm per meter, whereas "flexible" means that the support layer, taken alone, bends under the own weight thereof more than 10 cm per meter. The support layer may also comprise filler materials, such as mineral particles, for example chalk and or calcium carbonate. Said filler can be comprised in the support layer in a relatively high amount, e.g. more than 30 wt % or more than 60% wt of such filler materials. The fillers add weight to the support layer and make the support layer very effective in killing the transit of walking sound to lower quarters. Rigid PVC comprising fillers is also known as SPC (solid polymer composite). The content of filler should be preferably limited to less than 70 wt %, for example less than 50 wt %, in order to avoid excessively increasing brittleness of the support layer. In a preferred embodiment the support layer is made of rigid PVC since it provides for a support layer having good dimensional stability when exposed to variation of the temperature. Rigid PVC comprising fillers is also known as SPC (solid polymer composite) and generally comprises an amount of fillers up to 60% wt.

Preferably, the rigid polymeric material, like rigid PVC, comprises a thermal expansion coefficient less than 85 μm/m per ° C., preferably less than 60 μm/m per ° C. for example 50 μm/m per ° C. For example, thermal expansion coefficient of the support layer, especially in case it is made of rigid PVC, is comprised between 20 μm/m per ° C. and 85 μm/m per ° C., preferably between 40 μm/m per ° C. 60 μm/m per ° C. Inventors have found that best results in terms of impact strength are achievable by means of a support layer made of rigid polymeric material, preferably PVC. Therefore, according to a preferred embodiment, the support layer is made of a rigid polymeric material, preferably PVC, that may comprise a flexural modulus between 1.5 and 3.5 GPa, for example, approximately 2.6 GPa. The support layer may also comprise a flexural strength between 60 and 90 MPa, for example approximately 76 MPa. Moreover, the support layer may comprise a compressive strength between 40 and 70 MPa, for example approximately 56 MPa. In fact, inventors have found that the rigidity of the support layer helps absorbing the impact energy thereby improving the impact strength.

According to another embodiment, a support layer made of flexible PVC, or from any other material, thermoplastic or not, can be designed in such a way to compensate to variations of dimension due to variations of the temperature. For example, the support layer can be formed of a plurality of separated elements, for example strips, or can comprises grooves separating adjacent portions of the support layer thereby permitting the expansion of said portions without affecting the global stability of the floor. Said grooves are preferably, opened toward the lower surface of the support layer.

Furthermore, the support layer has preferably a thickness comprised between 2 and 7 mm, preferably less than 6 mm, more preferably about 4 mm or less. A thinner support layer provides for a limited cost and, and a higher thermal stability, in particular because the thermal expansion of a thinner support layer can be more effectively suppressed by the rigidity of the support layer. For example, a preferred embodiment of the invention provides for a support layer made of rigid PVC and showing a thickness of 4 mm, thereby representing a good solution in terms of thermal stability, noise reduction, low weight and low cost.

The thickness of the floor element is less than 20 mm, preferably 18 mm or less, more preferably 13 mm or less. For example, the surface weight of the floor element is at least 18 kg/sqm, preferably at least 21 kg/sqm. For example, in a preferred embodiment wherein the decorative layer is made of porcelain and comprises a thickness of 8.5 mm and wherein the support layer is made of PVC and comprises a thickness of 4 mm, the surface weight of the floor element is approximately 24 kg/sqm.

The floor element may comprise any dimension, although it is preferred that it comprises a superficial area of less than 1.5 sqm, preferably less than 1 sqm, more preferably less than 0.4 sqm. For example, the floor element, and in particular the decorative layer, can comprise an edge having a maximum length of less than 1.5 m, preferably less than 0.9 m. It can be considered that the planarity deviation is often a function of the length of the edges of the floor element, and in particular the longer the edge, the higher the planarity deviation could be. Therefore, to limit the length of the edges can prevent an excessive planarity deviation of the floor element that can complicate the coupling.

As stated above the floor element comprises edges provided with coupling elements. Said coupling elements are such that in a connected state of two similar floor elements engage into each other to create a mechanical coupling between the respective edges, preferably resulting in a mechanical locking between said edges in vertical and/or one or more horizontal directions. As used herein, the term "mechanical coupling" includes a coupling that allows adjacent floor elements to be coupled each other without the need for glue or the like. Specifically, in a coupled condition of two of said adjacent floor elements, the coupling elements cooperate and preferably form locking surfaces limiting the mutual movement of said floor elements in vertical and/or one or more horizontal directions.

As used herein, the terms "horizontal" and "vertical" are basically expressed regarding a floor covering installed on a surface which is considered to be horizontal in its general meaning. Thus, when used regarding a single floor element which is a substantially flat element provided with a main plane, the terms "horizontal" and "vertical" are to be considered respectively equivalent to the terms "parallel with respect to the main plane of the floor element/installed floor elements" and "perpendicular with respect to the main plane of the floor element/installed floor elements".

The coupling elements are configured to allow realizing a coupling by means of a movement of one floor element with respect to another adjacent floor element. Such movement may be a translational motion in a downward, e.g. vertical, direction, a translational motion in a horizontal direction, e.g. perpendicular to the edges or an angling motion around a horizontal axis parallel to the edges.

According to a preferred embodiment of the invention, the coupling elements can be disposed substantially along the whole length of the related edge, for example, substantially defining the related edge. According to another embodiment, the coupling elements can be interrupted along the relative edge so that empty spaces are provided between subsequent portions of the coupling elements. In this way, in a coupled condition, said empty spaces can be at least partially filled by the grout to further improve the bonding between the grout and the floor elements thereby increasing the fatigue resistance of the floor covering.

The coupling elements are preferably configured so that, in a coupled condition, the coupling is free from pretension so that the coupling is simplified, and a lower force needs to be exerted by the operator. That is to say that, in the coupled condition the coupling elements are in an undeformed condition. Moreover, also the coupling movement of the coupling element, i.e. the relative movement between the coupling elements that allows the mechanical coupling, occurs without deformation of the coupling elements. For example, in the most preferred embodiment a play is established between the coupling elements so that tiny movements between the coupling elements in a vertical and/or horizontal direction are admitted. For example, the dimension of the male part on a plane orthogonal to the respective edge is equal or slightly smaller than the dimension of the female part on the same plane. Preferably said play is larger than 0.01 mm and lower than 0.15 mm, more preferably said play is comprised between 0.03 and 0.1 mm. It is also preferred the coupling elements are configured such that in a coupled condition an inoperative space is established between the coupling element, for example a vertical and/or a horizontal inoperative space. In particular, it is preferred that one coupling element is smaller than the other coupling element so that the relative movement for coupling the floor elements is definitely improved and it is made possible to couple coupling elements of edges lying on different planes.

Preferably, the coupling element a male part positioned along a first edge and a female part positioned along an opposite second edge and forms a recess for at least partially receive the male part, preferably a protruding portion thereof. Said recess of the female part, comprises an inlet opening having a vertical breadth. preferably with the characteristic that the ratio between the vertical breadth and the thickness of the support layer is more than 0.4, preferably more than 0.45, more preferably more than 0.5, even more preferably about 0.53. Preferably, the ratio between the vertical breadth and the thickness of the support layer is comprised between 0.4 and 0.7, preferably between 0.5 and 0.6. A female part of the coupling element having an enlarged vertical inlet opening provides the possibility to engage the male part with the female part of two adjacent floor elements even in case of highly bowed floor elements. In fact, in this way a male part can engage an adjacent female part even if it is at a different height. This is particularly the case of an offset installation wherein the central portion of one floor element is at an upper height with respect of the extremal portion of an adjacent floor element. It is to be noted that preferably the vertical breadth of the inlet opening may correspond to the maximum breadth of the recess of the female part. According to a preferred embodiment of the invention, the vertical breadth is greater than 1.6 mm, preferably greater than 1.8 mm, more preferably greater than 2 mm. In this way it would be possible to couple two floor elements having a planarity deviation of 1 mm or more measured between the center and the ends of the edge, even in a 50/50 offset installation. It is to be noted that the vertical breadth of said inlet opening is preferably measured substantially on the vertical plane on which lies the upper edge of said first edge. Preferably the coupling elements are as described in application U.S. Ser. No. 16/278,560 which is hereby incorporated by reference.

Moreover, between the upper border of the inlet opening of the recess and the upper edge of said first edge, is provided a distance. The ratio between said distance and the thickness of the support layer can be less than 0.2, preferably less than 0.15. For example, said ratio can be comprised between 0.2 and 0.1. A reduced distance between the inlet opening and the upper edge increases the chances of easily inserting the male part into the recess of the female part in case the male part is disposed at an upper level with respect to the recess. For example, said distance can be less than 0.9 mm, preferably less than 0.6 mm. For example, said distance can be comprised between 0.9 and 0.4 mm.

According to a preferred embodiment, the male and the female parts can be basically shaped as a tongue and a groove. According to a preferred embodiment, the tongue comprises a horizontal extending lip and a downward projecting hump. In a preferred embodiment the horizontally extending lip has a section tapered toward its tip. As a consequence, in this embodiment, the groove has a horizontal recess, for receiving the lip of the tongue, and an upward oriented hollow portion, for receiving the hump of the tongue, so that tongue can be fitted into the groove.

Although the tongue and groove embodiment is a preferred one, it is not excluded that the coupling elements can be realized according to other embodiment. For example, the coupling element can be provided in form of upward oriented hook-shaped element and downward oriented hook-shaped element for coupling following a vertical movement. Said coupling elements are described in application Ser. Nos. 16/028,745 and 16/278,560 which are hereby incorporated by reference.

Preferably, said coupling elements are at least partially, and preferably entirely, formed in said support layer.

Preferably, the support layer has a shape basically corresponding to the decorative layer, however, preferably, with one or more portions extending beyond the decorative layer. The support layer may also comprise one or more recesses extending underneath the decorative layer. The support layer preferably is a coherent element, wherein the support layer preferably covers the majority, i.e. at least 50 percent, of the lower surface of said decorative layer. Preferably the support layer covers 80 percent or more of the lower surface of the decorative layer. According to a variant, the support layer comprises a plurality of separate adjacent support layer portions, in which case said plurality of support layer portions preferably covers at least 50 percent of the lower surface, or even 80 percent or more thereof.

In a coupled condition of two of said floor elements preferably an intermediate distance is available between the respective upper edges of adjacent floor elements. Preferably, the decorative layer is mounted on the support layer in such a way that when the floor elements are in a coupled condition said intermediate distance is available between the edges of adjacent decorative layers, while the edges of the underlying support layer are coupled to each other by means of the available coupling elements. In particular, the support layer comprises a portion that extend beyond at least one edge, preferably more than one, more preferably all the edges of the decorative layer. For example, the support layer can extend beyond the edges of the decorative layer of a predetermined distance, preferably but not necessarily said distance is the same on all the edges, in this case said predetermined distance is the half of said intermediate distance. For example, said intermediate distance can be of at least 1.5 millimeters, for example about 3 millimeters.

Preferably said intermediate distance between the floor elements can be filled by a grout thereby providing an impermeable floor covering. Preferably a polymeric and/or cement-based grout is used. The grout may be a flexible or rigid grout. A flexible grout may be for example a silicone-based grout whereas a rigid grout may be for example an epoxy-based grout or cement-based grout. Epoxy-based, and silicone-based are example of polymeric grout, other examples of polymeric grout are polyurethane-based or acrylic-based grout.

In a preferred embodiment, the grout can show a compressive strength greater than 20 MPa, for example comprised between 24 and 60 MPa. Preferably, the grout can show an hardness Shore A greater than 70, for example between 80 and 90.

According to a preferred aspect of the invention the floor covering comprises an underlayer disposed beneath the floor elements. Preferably said underlayer is configured to act as a moisture and/or noise barrier.

According to a preferred embodiment, the underlayer is made of a polymeric material, preferably a thermoplastic material. In the most preferred embodiment, the underlayer is made by a compressible material, more preferably a foamed material. A compressible material is a preferred choice since it can help the underlayer to absorb unevenness of the subfloor to avoid lippage in the floor covering. Moreover, the inventors have found that a compressible underlayer is deformed under the weight of the floor elements and after a settling period the floor covering becomes more rigid and stable thereby improving at the same time, the fatigue resistance of the floor and its planarity. According to a preferred embodiment of the invention the underlayer comprises, for example is made of, crosslinked polyolefin foam such as, for example, crosslinked polyethylene foam, or crosslinked polypropylene foam. Alternatively, the underlayer can be made of other polymers, possibly foamed, like, for example, expanded polystyrene, rubber, polyurethane.

Preferably, the underlayer has a thickness less than 4 mm, for example less than 3 mm. In an embodiment of the invention the underlayer has a thickness greater than 1 mm, for example greater than 1.5 mm. Preferably, the underlayer has a thickness comprised between 1 and 3 mm, preferably 2 mm.

Preferably, the underlayer may comprise an impact insulation class higher or equal to IIC 66 measured according to ASTM E492. The underlayer may show, also, a sound transmission class higher or equal to STC 66 measured according to ASTM E90. The underlayer may show a compressive strength comprised between 50 and 500 kPa, at 0.5 deflection, measured according to ASTM D3575.

In the floor covering, the floor element can be disposed according to several installation possibilities.

In a first installation possibility the floor elements are disposed according to a regular flanked pattern wherein any floor element is flanked by only one adjacent floor element along a whole edge.

According to a second installation possibility the floor elements are disposed according to an offset pattern, for example a one third offset pattern or a 50/50 offset pattern. It is to be noted that for floor covering comprising ceramic tile, especially if rectangular and oblong, in traditional installation 50/50 offset pattern is impossible because as the tiles are bowed the resulting floor covering would show an excessive lippage or height difference. Due to the mechanical coupling the floor elements can be disposed in a 50/50 offset pattern resulting in a levelled floor covering without lippage.

According to an embodiment of the invention, in order to simplify installation in offset pattern, the floor element can comprise at least a mark or indication to indicate how the floor elements shall be installed. For example, said marks can be provided on the edges of the floor element, preferably at least on the long edges. For example, said marks can be disposed at one third and/or at the half of the length of the edge. The mark can also be provided on only of two opposite edge in order to identify the coupling element, for example the female part. This can be useful also in manufacturing so that the floor element can be always oriented in the correct way. Preferably the mark is provided only on the support layer or in general in a position that is destined to be hidden once installation is complete. For example, the mark can comprise a colored sign a symbol, preferably printed, and/or an incision and/or a relief.

According to a third possibility the floor elements are disposed according to a herringbone patter. Therefore, the coupling element shall be configured to allow herringbone installation, this is possible in several ways a list of which is here included as non-exhaustive examples. In a first way, the coupling elements are male and female coupling elements and the floor covering comprises a first group and a second group of floor element wherein in the first group the male and the female coupling element are disposed on specular edges with respect to the second group. In a second way the floor element comprises the same coupling element on all the edges, for example the female, and the floor covering comprises insert elements having a coupling element configured to couple with that of the floor elements, for example a male coupling element. In a third way, the coupling elements on the short edge has an insert that makes it compatible with the coupling element on the long edge, for example the coupling elements are as described in application U.S. Ser. No. 16/096,025 which is hereby incorporated by reference. According to a third way the floor elements comprise coupling elements as described in application U.S. 62/862,850 which is hereby incorporated by reference.

According to a second independent aspect of the invention, there is provided a floor covering comprising a plurality of adjacent floor elements, wherein each floor element comprises a decorative layer of ceramic material and a support layer disposed below the decorative layer, and an intermediate layer in between the decorative layer and the support layer, wherein the intermediate layer comprises at least one edge that is offset relative to a respective edge of the decorative layer, the floor elements further comprise coupling means configured to realize a mechanical coupling with coupling elements of adjacent floor elements; the floor covering comprises a grout filling an intermediate distance separating the decorative layers of the floor elements. Preferably the floor elements are separated from a subsurface, for example the subfloor, i.e. they are not bonded to the subsurface by means of adhesive or mechanical means. Preferably, the grout at least partially fills an empty space formed between the decorative layer and the support layer. By means of the third aspect, the inventors have finally offered a solution to a long-felt need in the ceramic flooring world. They have provided an easy to be installed ceramic tile flooring, with a good impact strength, waterproofness and fatigue strength. The floor elements of the first aspect, and preferred embodiments thereof, may be used to form a floor covering in accordance with the present second aspect.

It is to be noted that the coupling elements for the herringbone pattern form a general inventive concept independent from other features of the floor element like for example the intermediate layer and its features. Therefore, a floor element comprising a decorative layer, a support layer provided with coupling elements on its edges wherein the coupling elements are configured to allow herringbone installation, forms a third independent inventive aspect of the invention, which can comprise any other feature described in relation to the other independent aspects.

It is also to be noted that the floor element comprising said mark forms a general inventive concept independent from other features of the floor element like for example the intermediate layer and its features. Therefore, a floor element comprising a decorative layer, a support layer provided with coupling elements on its edges and comprising a mark identifying a specific edge and/or a specific position along an edge of the floor element, forms a fourth independent inventive aspect of the invention, which can comprise any other feature described in relation to others independent aspects.

Furthermore, the fact that in the floor covering the floor elements are disposed according to a 50/50 offset pattern form an inventive idea irrespective of other features of the flor element and/or of the floor covering. Therefore, according to a fifth independent aspect the invention relates to a floor covering comprising a plurality of floor elements wherein the floor elements comprise a decorative layer comprising a ceramic material, a support layer disposed below said decorative layer, wherein the floor elements further comprise coupling means configured to realize a mechanical coupling with coupling elements of adjacent floor elements, wherein the floor elements are disposed in a 50/50 offset pattern. Due to said inventive aspect is provided a floor covering with an innovative pattern without any lippage. In fact, it is to be noted that the mechanical coupling between the floor elements permits to flatten the floor elements and as a consequence the floor covering. Preferably the floor elements in the fifth inventive aspect are rectangular and oblong in shape. The floor elements and/or the floor covering can comprise any of the features described in relation to the others independent aspects.

It is also noted that, the fact that the floor covering comprises a compressible underlayer forms an inventive idea irrespective of other features of the flor element and/or of the floor covering. Therefore, according to a sixth independent aspect the invention relates to a floor covering comprising a plurality of floor elements wherein the floor elements comprise a decorative layer comprising a ceramic material, a support layer disposed below said decorative layer, wherein the floor elements further comprise coupling means configured to realize a mechanical coupling with coupling elements of adjacent floor elements, wherein the floor covering comprises at least an underlayer made of a compressible material. The floor elements and/or the floor covering can comprise any of the features described in relation to the others independent aspects.

Furthermore, the floor element comprising an intermediate layer made of a resin material forms an inventive concept irrespective of other features of the floor element. Therefore, according to a sixth independent aspect the invention relates to a floor element comprising a decorative layer made of a ceramic material, a support layer disposed below said decorative layer, and an intermediate layer disposed between the decorative layer and the support layer, with the characteristic that said intermediate layer comprises a resin material. The resin material and the floor element in general can comprise any of the features described in relation to the others independent aspects.

Figure 2:
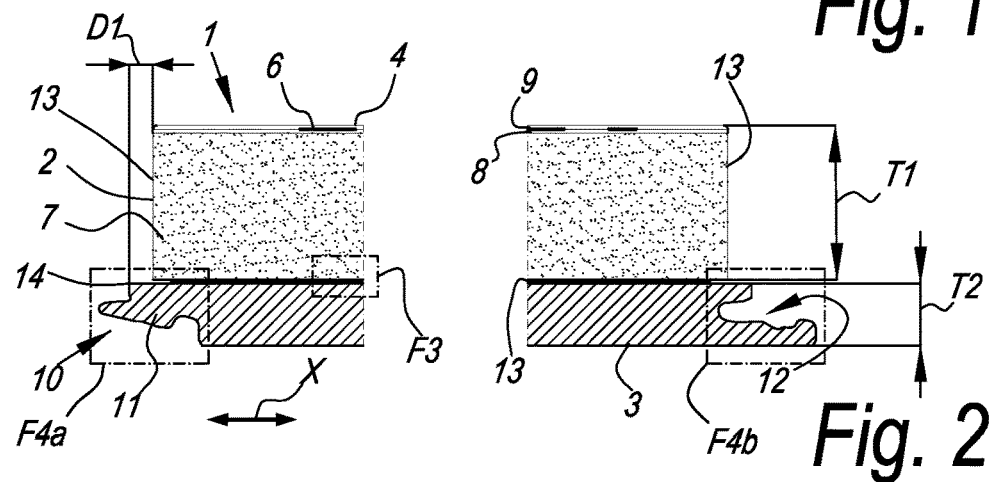
FIG. 2 on a larger scale shows a cross section along the line II-II of FIG. 1.
Figure 3:
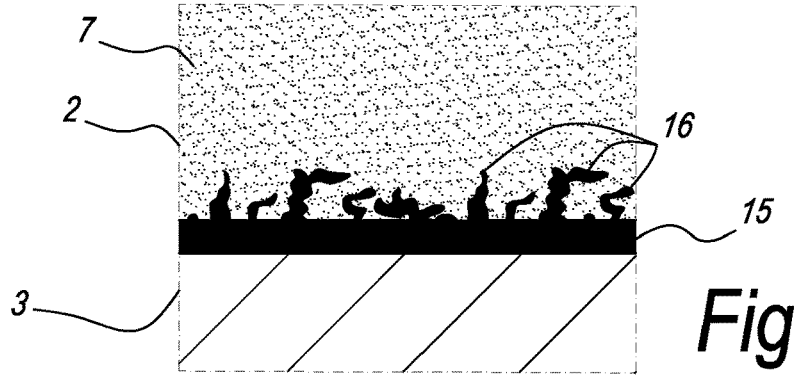
FIG. 3 on a larger scale shows a view on the area F3 indicated on FIG. 2.
Figures 4A, 4B:
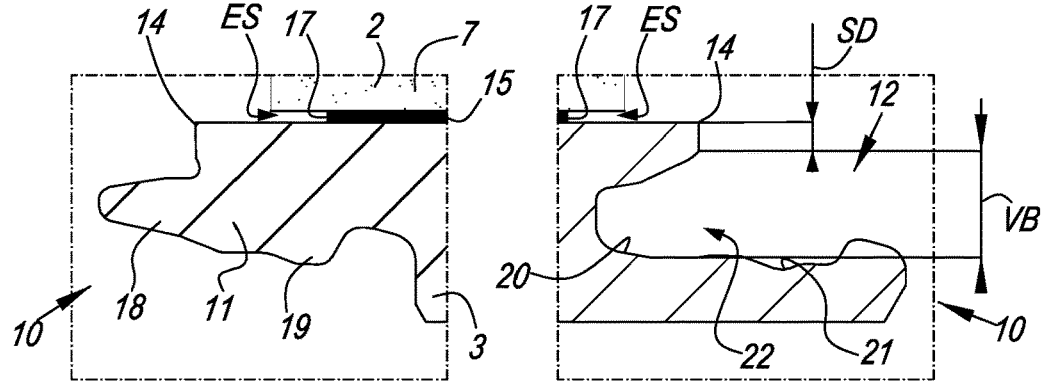
FIGS. 4a and 4b on a larger scale respectively show a view of the areas F4a and Fb indicated on FIG. 2.
Figure 5:
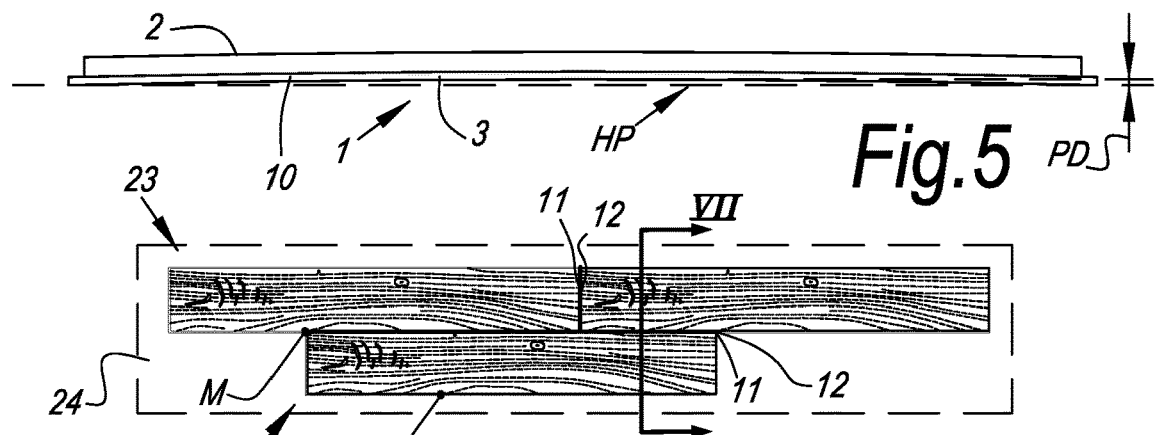
FIG. 5 show a schematic side view of a floor element of FIG. 1.
Figure 6:
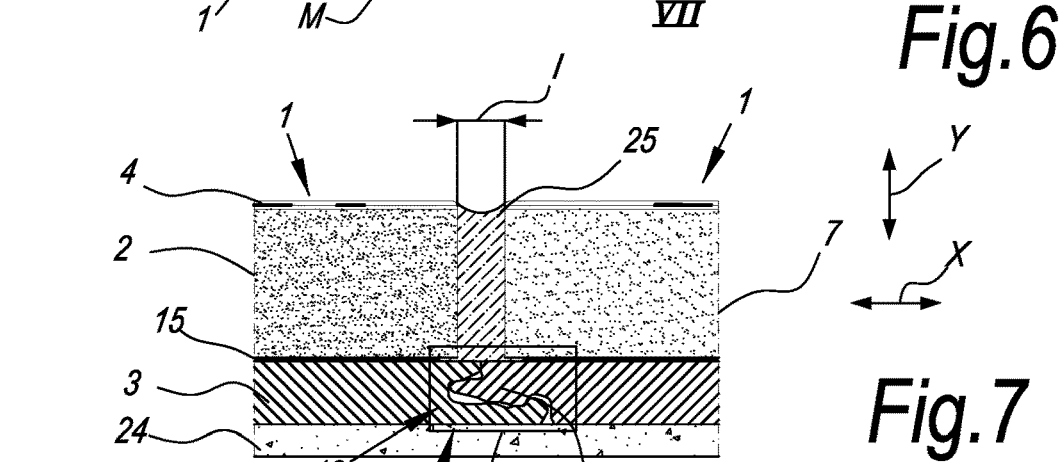
FIG. 6 on a smaller scale shows a top plane view of a floor covering comprising a plurality of the floor elements of FIG. 1 arranged in a first pattern.
Figure 7:
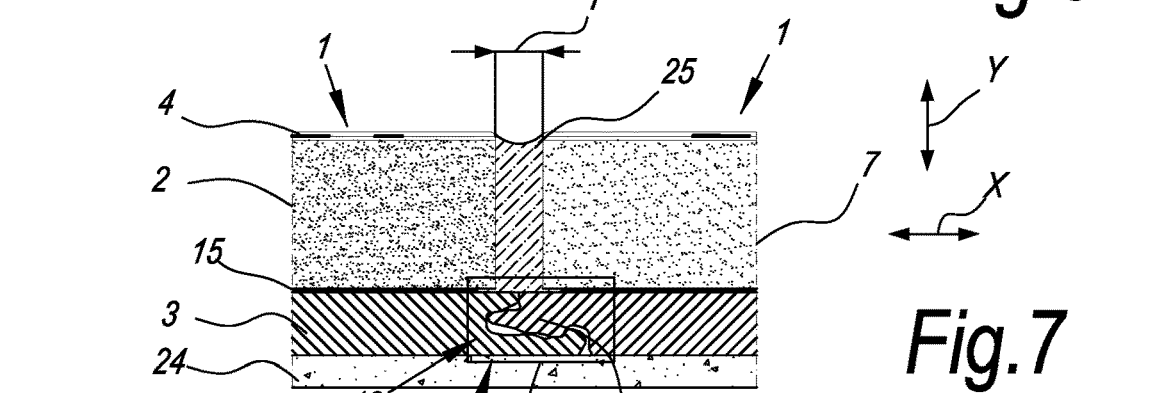
FIG. 7 on a larger scale shows a cross section along the line VII-VII of FIG. 6.
Figure 8:
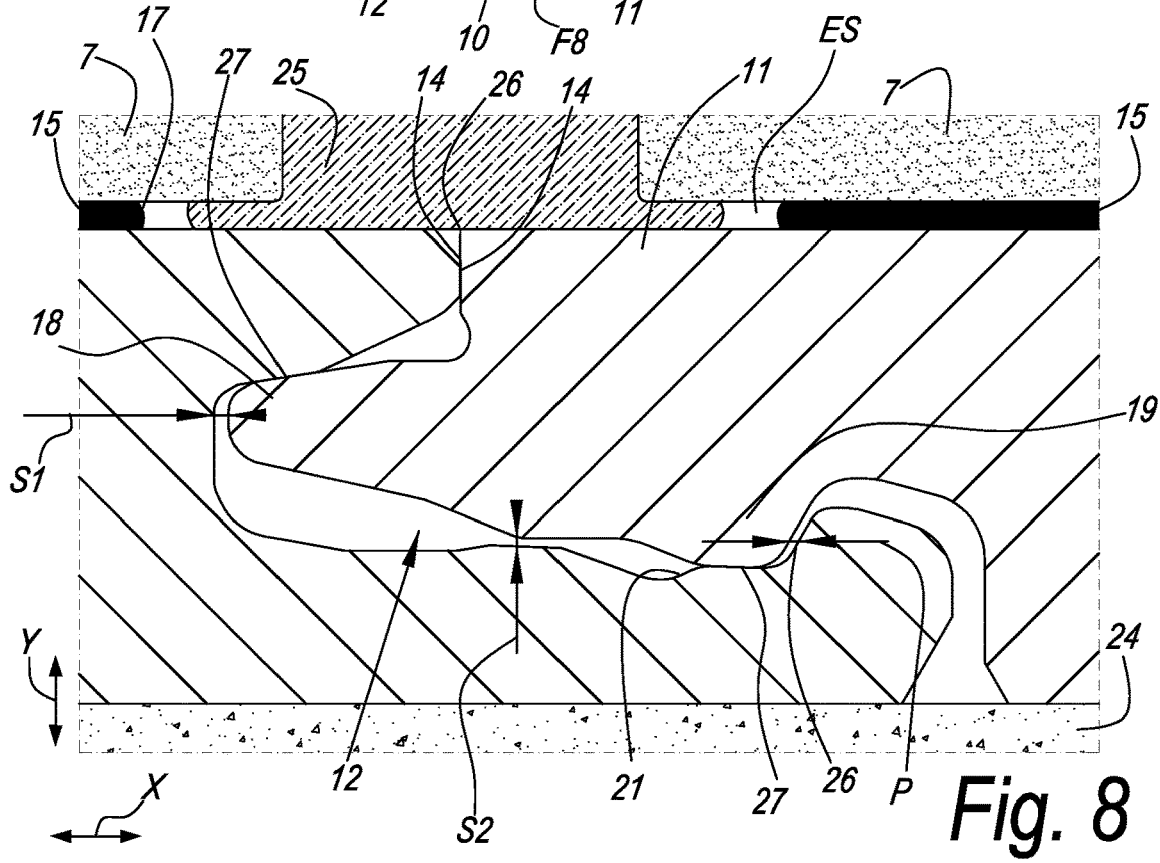
FIG. 8 on a larger scale shows a view on the area F8 indicated on FIG. 7.
Figure 9:
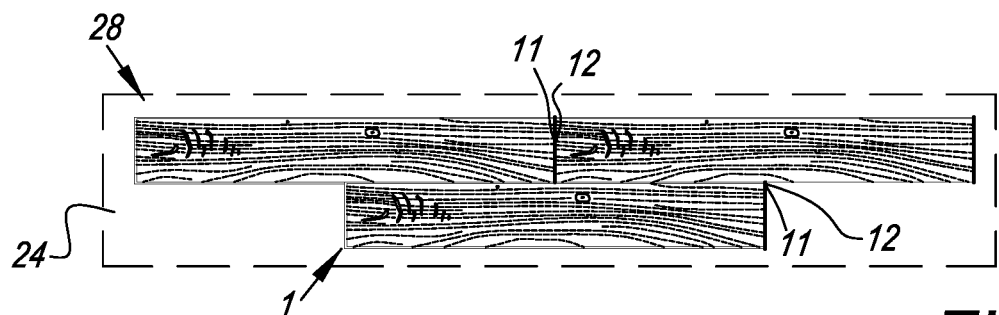
FIG. 9 on a smaller scale shows a top plane view of a floor covering comprising a plurality of the floor elements of FIG. 1 arranged in a second pattern.
Figure 10:
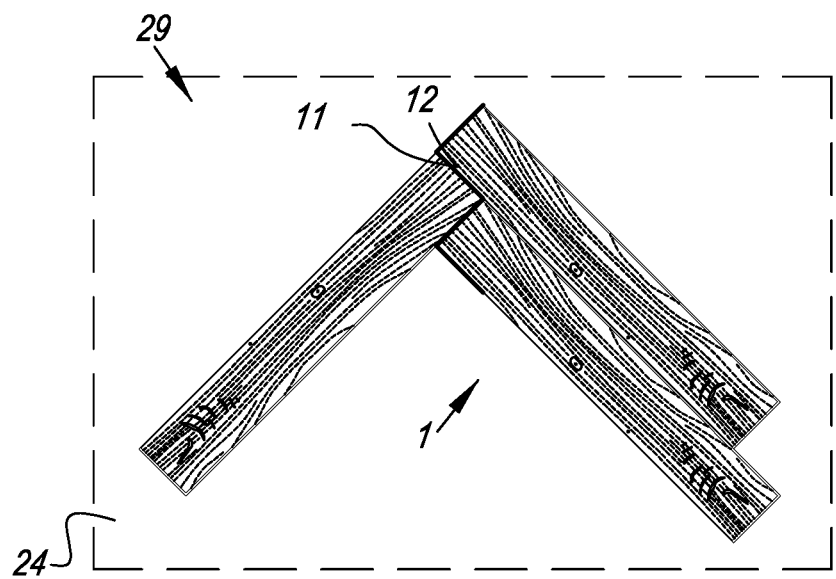
FIG. 10 on a smaller scale shows a top plane view of a floor covering comprising a plurality of the floor elements of FIG. 1 arranged in a third pattern.

With the intention of better showing the characteristics of the invention, in the following, as an example without any limitative character, several preferred forms of embodiments are described with reference to the accompanying drawings, wherein:

FIG. 1 shows a top view of a floor element of the invention;

FIG. 2 on a larger scale shows a cross section along the line II-II of FIG. 1;

FIG. 3 on a larger scale shows a view on the area F3 indicated on FIG. 2;

FIGS. 4a and 4b on a larger scale respectively show a view of the areas F4a and Fb indicated on FIG. 2;

FIG. 5 show a schematic side view of a floor element of FIG. 1;

FIG. 6 on a smaller scale shows a top plane view of a floor covering comprising a plurality of the floor elements of FIG. 1 arranged in a first pattern;

FIG. 7 on a larger scale shows a cross section along the line VII-VII of FIG. 6;

FIG. 8 on a larger scale shows a view on the area F8 indicated on FIG. 7;

FIG. 9 on a smaller scale shows a top plane view of a floor covering comprising a plurality of the floor elements of FIG. 1 arranged in a second pattern;

FIG. 10 on a smaller scale shows a top plane view of a floor covering comprising a plurality of the floor elements of FIG. 1 arranged in a third pattern.

FIG. 1 shows a top view of a first embodiment of a floor element 1 according to the invention. The floor element 1 comprises a decorative layer 2 disposed above a support layer 3.

As illustrated, the floor element 1 comprises a rectangular elongated shape. Preferably, the floor element 1 comprises a superficial area of less than 1.5 sqm, preferably less than 1 sqm, more preferably less than 0.4 sqm. For example, the decorative layer 2 comprises edges having a maximum length L of less than 1.5 m, preferably less than 0.9 m.

The decorative layer 2 has an upper face 4 comprising a décor 5. The décor 5 can be provided with a variety of textures, designs and colors. In the illustrated example the décor 5 simulates a wood pattern comprising wood nerves and flakes. Preferably, the décor 5 is at least partially formed by a print 6. The print 6 is preferably realized by means of digital printing, such as inkjet printing, although screen printing, rotogravure, flexography or off-set printing is not excluded.

FIG. 2 on a larger scale shows a cross section along the line II-II of FIG. 1. According to the illustrated example the decorative layer 2 comprises a body 7 made of a ceramic material, for example red body ceramic or porcelain.

The decorative layer 2 comprises a background coating 8 covering at least partially the upper surface of the body 7, for example comprising at least a glaze. The background coating 8 is adapted to receive the décor 5 on its top, for example adapted to receive the print 6 on its top. The background coating 8 can be white, beige, brown or of any color suitable to receive the décor 5 on its top. The decorative layer 2 further comprises a protective coating 9 covering at least partially the upper surface of the body 7, for example comprising at least a glaze. The protective coating 9 is adapted to be placed above the décor 5 and is transparent or translucent.

FIG. 2 also shows that decorative layer 2 has a thickness T1 comprised between 4 and 15 mm, for example 6 mm, preferably greater than 7 mm, for example 8 or 10 mm.

The support layer 3, according to the example, is made of a polymeric material, preferably a thermoplastic material like PVC. In a preferred embodiment, the support layer is made of a rigid PVC. Within the context of the present description, "rigid" means that the support layer, taken alone, bends under the own weight thereof less than 10 cm per meter and still better less than 5 cm per meter. The support layer 3 may also comprise a high amount of filler materials, such as chalk, e.g. more than 30 wt % or more than 60% wt of such filler materials.

Moreover, according to a preferred embodiment, the support layer 3 is made of a rigid PVC that may comprise a flexural modulus between 1.5 and 3.5 GPa, for example, approximately 2.6 GPa. The support layer 3 may also comprise a flexural strength between 60 and 90 MPa, for example approximately 76 MPa. Moreover, the support layer 3 may comprise a compressive strength between 40 and 70 MPa, for example approximately 56 MPa. Preferably, the support layer 3 comprises a thermal expansion coefficient less than 85 µm/m per ° C., preferably less than 60 µm/m per ° C. for example 50 µm/m per ° C. For example, thermal expansion coefficient of the support layer 3 is comprised between 20 µm/m per ° C. and 85 µm/m per ° C., preferably between 40 µm/m per ° C. 60 µm/m per ° C.

Furthermore, the support layer 3 preferably has a thickness T2 comprised between 2 and 7 mm, preferably less than 6 mm, for example about 4 mm.

As shown in FIG. 1, the floor element comprises a mark M provided on one of the long edges of the support layer 3 to help installation of the floor element 2. In the example, said mark M is disposed at one third of the length of said long edge, which corresponds to the length L of the floor element. For example, the mark M can comprise a colored sign a symbol, preferably printed, and/or an incision and/or a relief.

FIG. 2 also shows that the support layer 3 comprises longitudinal edges 10 provided with first coupling elements 11, 12 configured to realize a mechanical coupling with coupling elements 11, 12 of an adjacent floor element 1. In the illustrated examples the coupling elements 11, 12 comprise a male and female parts disposed on opposite longitudinal edges 10.

The first coupling elements 11, 12 of the longitudinal edges 10 are configured for being coupled each other by means of an angling motion around a horizontal axis parallel to the longitudinal edges 10. The male and female parts are respectively shaped in form of a tongue 11 and a groove 12 wherein the tongue 11 projects outwardly beyond its respective longitudinal edge 10 in a horizontal direction X and the groove 12 projects inwardly with respect to the respective longitudinal edge 10 in said horizontal direction.

The support layer 3 extends beyond longitudinal edges 13 of the decorative layer 2. In the example, the support layer 3 comprises upper longitudinal edges 14 that extend beyond the longitudinal edge 13 of the decorative layer 2 of a distance DI. Said distance DI is equal on both the opposite longitudinal edges 13 of the decorative layer 2.

In a preferred embodiment, the coupling elements 11, 12 are the same on the longitudinal and on the transversal edges of the support layer 3.

FIG. 2 further shows that the floor element 1 comprises an intermediate layer 15 disposed between the decorative layer 2 and the support layer 3.

The intermediate layer 15 comprises a resin material, for example a thermosetting resin or thermoplastic resin. Examples of thermosetting resin are epoxy, polyurethane, cyanoacrylate, unsaturated polyester, vinyl ester or acrylic resin. Examples of thermoplastic resin are hot melt, polyester thermoplastic, vinyl etc. Preferably the resin is a rigid resin. In particular, according to a preferred embodiment of the invention the intermediate layer 15 comprises an epoxy resin. It is also preferred that the epoxy is a bicomponent resin, i.e. a thermosetting resin obtained by curing at low temperature (for example at room temperature) a mixture of two components, namely a resin and a hardener.

The resin preferably comprises a tensile strength between 50 and 90 MPa, more preferably between 60 and 80 MPa, for example 75 MPa. Moreover, the resin preferably comprises a compressive strength between 90 and 130 MPa, more preferably between 100 and 120 MPa, for example 110 MPa. It is also preferable that the resin shows a hardness value of at least 50 measured on a Shore D scale.

The resin is preferably provided onto the lower surface of the decorative layer 2 in an amount more than 150 g/sqm, more preferably more than 200 g/sqm, for example 220 g/sqm.

In a preferred example illustrated in FIG. 2, the intermediate layer 15 is in direct contact with the upper surface of the support layer 3 so that act as a glue between the decorative layer 2 and the support layer 3.

FIG. 3 on a larger scale shows a view on the area F3 indicated on FIG. 2. As illustrated in FIG. 3 the decorative layer 2, more in detail the body 7 thereof, comprises, at least in correspondence of its lower surface, an open porosity 16 adapted to be permeated by the resin of the intermediate layer 15.

Thus, according to a preferred embodiment of the invention, the decorative layer 2 comprises an apparent porosity between 0.1% and 10% determined according to ASTM C373, more preferably between 2% and 8%, for example 6%. Furthermore, the decorative layer 2 may preferably have a volume of the open pores 16 comprised between 0.01 cc (cubic centimeter) and 1 cc, more preferably between 0.10 cc and 0.90 cc, for example 0.60 cc.

Therefore, in order to properly flow into said open pores 16 the resin of the intermediate layer 15 comprises a viscosity less than 1000 Pas, preferably less than 800 Pas, more preferably less than 600 Pas, for example approximately 400 Pas at 20° C. The resin of the intermediate layer 15 may have a viscosity greater than 1 Pas, and preferably greater than 10 Pas, for example greater than 100 Pas at 20° C. The resin may have a viscosity between 1 Pas and 1000 Pas at 20° C., including between 10 Pas and 1000 Pas at 20° C. Within the scope of the invention "viscosity" means the viscosity of the uncured resin, for example the viscosity of the mixture of the two components before the completion of the curing, i.e. during the so-called pot life.

According to another embodiment the resin of the intermediate layer 15 is in a viscous state, for example in a pasty or gel state, in this case it can also show a thixotropic behavior. According to this embodiment, the resin may comprise a viscosity greater than 1000 Pas, preferably greater than 1200 Pas, more preferably greater than 1400 Pas, for example approximately 1500 Pas at 20° C. The resin may have a viscosity greater than 1800 Pas, preferably greater 2000 Pas, for example 2200 Pas at 20° C. The resin of the intermediate layer may have a viscosity between 1000 Pas and 2200 Pas at 20° C., including between 1500 Pas and 2200 Pas at 20° C. According to this embodiment the reinforcing effect is provided by the rigidity of the resin that may not permeate the open porosity 16 of the decorative layer.

FIGS. 4a and 4b show on a larger scale a view on the areas F4a and F4b indicated on FIG. 2.

As visible from FIGS. 4a and 4b, the intermediate layer 15 comprises edges 17 that are offset with respect to the edges 13 of the decorative layer 2. In the illustrated embodiment said edge 16 of the intermediate layer 15 projects inwardly with respect to the respective edge 13 of the decorative layer 2. By turning the point of view, the edge 13 of the decorative layer 2 extends beyond the respective edge 16 of the intermediate layer 15. In this way an empty space ES between the decorative layer 2 and the support layer 3 is established.

FIG. 4a shows in more detail the tongue 11 which comprises a horizontally extending lip 18 and a downward projecting hump 19. The horizontally extending lip 18 extends beyond the upper edge 14 of the longitudinal edge 10. Moreover, the horizontally extending lip 18 has a section tapered toward its tip.

FIG. 4b shows in more detail the groove 12 which has a horizontal recess 20, for receiving the lip 18 of the tongue 11, and an upward oriented hollow portion 21, for receiving the hump 19 of the tongue 11, so that tongue 11 can be fitted into the groove 12.

The horizontal recess 20 comprises an inlet opening 22 having a vertical breadth VB which is at least 0.4 times the thickness T2 of the support layer 3, preferably more than 0.45 times, more preferably more than 0.5 times, even more preferably about 0.53 times. Preferably, the ratio between the vertical breadth VB and the thickness of the support layer is comprised between 0.4 and 0.7, preferably between 0.5 and 0.6. It is to be noted that the vertical breadth VB of said inlet opening 22 is preferably measured substantially on the vertical plane on which lies the upper edge 14 of the longitudinal edge 10. It is also to be noted that preferably the vertical breadth VB may correspond to the maximum breadth of the recess 20 of the groove 12.

Moreover, between the upper border of the inlet opening 22 of the recess 20 and the upper edge 14 of the longitudinal edge 10 is provided a separating distance SD. The ratio between said separating distance SD and the thickness T2 of the support layer 3 can be less than 0.2, preferably less than 0.15. For example, said ratio between said separating distance SD and the thickness T2 of the support layer 3 can be comprised between 0.2 and 0.1. For example, said separating distance SD can be less than 0.9 mm, preferably less than 0.6 mm. For example, said separating distance SD can be comprised between 0.9 and 0.4 mm.

FIG. 5 shows a schematic sideview of a floor element 1. The floor element 1, and in particular the support layer 3 shows a planarity deviation PD greater than 0.1 mm, for example greater than 0.4 mm. It is preferable that the planarity deviation PD is less than 1.5 mm, more preferably less than 1 mm, even more preferably less than 0.8 mm. Within the scope of the present invention, the planarity deviation PD is measured by placing floor element 1 on a horizontal plane HP and measuring the distance between the middle of the long edge 10, and the horizontal plane HP. FIG. 5 shows a floor element 1 wherein the planarity deviation has been highly enhanced and is not in scale to help the description and explanation.

FIG. 6 is a top plane view of a floor covering 23 comprising a plurality of floor elements 1 of FIG. 1 coupled by means of the coupling elements 11, 12 along the edges 10 of the support layer 3. In the floor covering 23 of FIG. 6 the floor elements 1 are disposed in a one third offset installation. Said offset installation, and in particular the mutual positioning of the floor elements 1 is simplified by the mark M which indicate at which position of the long edge 10 of one floor element 1 shall be placed the short edge of an adjacent floor element 1.

The floor covering 23 further comprises an underlayer 24 disposed beneath the floor elements 1. Said underlayer 24 is configured to act as a moisture and/or noise barrier. According to a preferred embodiment the underlayer 24 is made of a polymeric material, preferably a thermoplastic material. In the most preferred embodiment, the underlayer is made by a compressible material, more preferably a foamed material.

FIG. 7 on a larger scale shows a cross section along the line VII-VII of FIG. 6. The floor covering 23 comprises a grout 25 filling an intermediate distance I, separating the decorative layers 2 of the floor elements 1. According to the illustrated example, the intermediate distance I is twice the distance DI between the upper edge 14 of the support layer 3 and the edge 13 of the decorative layer 2.

The grout 25 may be a flexible or rigid grout. The grout 25 may be polymer-based, cement-based or be based on a mixture of polymer and cement. Examples of polymer-based grout are epoxy based, acrylic based, urethane based, silicone based. In a preferred embodiment the grout 25 is a flexible and urethane based.

FIG. 7 further shows that the underlayer 24 has a thickness less than 4 mm, for example less than 3 mm. In an embodiment of the invention the underlayer 24 has a thickness greater than 1 mm, for example greater than 1.5 mm. Preferably, the underlayer 24 has a thickness comprised between 1 and 3 mm, preferably 2 mm. According to a preferred embodiment of the invention the underlayer 24 comprises, for example is made of, crosslinked polyolefin foam such as, for example, crosslinked polyethylene foam, or crosslinked polypropylene foam. Alternatively, the underlayer 24 can be made of other polymers, possibly foamed, like, for example, expanded polystyrene, rubber, polyurethane.

Preferably, the underlayer 24 comprises an impact insulation class higher or equal to IIC 66 measured according to ASTM E492. The underlayer 24 shows, also, a sound transmission class higher or equal to STC 66 measured according to ASTM E90. The underlayer 24 shows a compressive strength comprised between 50 and 500 kPa, at 0.5 deflection, measured according to ASTM D3575.

FIG. 7 further shows a section of the mechanical coupling between the coupling elements 11, 12 along a plane transversal to the longitudinal edges 10. Said mechanical coupling between the coupling elements 11, 12 is described in detail with the aid of FIG. 8.

In the coupled condition shown in FIG. 8 the upper edges 14 of the support layers 3 contact each other thereby forming a first set of first locking surfaces 26 limiting the mutual movement of said floor elements 1 in a horizontal direction X perpendicular to the coupled longitudinal edges 10.

FIG. 8 also shows that in said coupled condition, the lip 18 is received by the recess 20. The upper surface of the lip 18 contacts un upper wall of the recess 20 thereby forming a first set of second locking surfaces 27 that limit the mutual movement of said floor elements 1 in a substantially vertical direction Y. It is noted that between the tip of the lip 18 and the bottom of the recess 20 is established a horizontal inoperative space S1. Moreover, between lower surface of the lip 18 and the recess 20 is established a vertical inoperative space S2.

The downward projecting hump 19 of the tongue 11 is received by the hollow portion 21 of the groove 12. The lower surface of the downward projecting hump 19 contacts said hollow portion 21 so that a second set of second locking surfaces 27 is formed.

In the coupled condition, of FIG. 7, between the downward projecting hump 19 and the hollow portion 21 is formed a horizontal play P that allows tiny horizontal movement of the tongue 11 into the groove 12. Said play P and said tiny horizontal movements are limited by a set of first contact surface 26 that may be formed between the projecting hump 19 and the hollow portion 21.

Preferably, said play P is greater than 0.01 mm and less than 0.15 mm, more preferably said play P is comprised between 0.03 and 0.1 mm.

It is noted that in the coupled condition the tongue 11 and the groove 12 are in an undeformed condition. Further, the whole angling movement that allows the coupling between the tongue 11 and the groove 12 occur without deformation of the first coupling elements 11, 12. In fact due to the play P and the inoperative spaces S1, S2 the coupling between the tongue 11 and the groove 12 is significantly simplified.

As visible in FIG. 8, the grout 25 can partially fill the empty space ES between the decorative layer 2 and the support layer 3 thereby improving its interaction with the floor elements 1 and increasing the fatigue resistance of the floor covering 24.

FIG. 9 shows a floor covering 28 wherein the floor elements 1 are disposed in a 50/50 offset pattern. Preferably the floor elements 1 are same of FIG. 1. In particular, the floor elements 1 may have the same planarity deviation PD of FIG. 5. It is to be noted that due to the mechanical coupling provided by the coupling elements 11, 12 the floor covering 28 does not show any lippage, or shows only a very tiny and not recognizable lippage, since the mechanical coupling forces the floor elements 1 to flatten recovering said planarity deviation PD.

FIG. 10 shows a floor covering 29 wherein the floor elements are in herringbone installation. In this floor covering the floor elements 1 comprise coupling elements 11, 12 adapted to permit a herringbone installation. For example, the floor covering 29 comprises a first group and a second group of floor elements 1 as described in FIGS. 1 to 8, wherein in the coupling elements 11, 12 in the first group of floor elements 1 are disposed on specular edges with respect to the coupling elements 11, 12 in the second group of floor elements 1. In an alternative, not shown embodiment, the coupling elements are as described in application U.S. 62/862,850 which is hereby incorporated by reference.

Further, as is clear from the content of the description, the present invention relates to one or more of the items as listed below, numbered from 1 to 104:

1.—A floor element for forming a floor covering, wherein the floor element comprises a decorative layer and a support layer, wherein the decorative layer is made of a brittle material, wherein the floor elements comprises edges provided with coupling elements adapted to cooperate with coupling elements of an adjacent similar floor element in said floor covering and wherein the floor element comprises an intermediate layer disposed between the decorative layer and the support layer, whit the characteristic that the intermediate layer comprises at least one edge that is offset relative to a respective edge of the decorative layer.

2.—The floor element according to item 1, wherein said edge of the intermediate layer projects inwardly with respect to the respective edge of the decorative layer.

3.—The floor element according to any of the preceding items, wherein a plurality, for example all, the edges of the intermediate layer are offset relative to a respective edge of the decorative layer.

4.—The floor element according to any of the preceding items, wherein the intermediate layer covers a portion of the lower surface of the decorative layer, for example the majority, i.e. at least 50 percent, of the lower surface of said decorative layer.

5.—The floor element according to any of the preceding items, wherein the intermediate layer covers a portion of the lower surface of the decorative layer comprised between 80 and 100%, preferably between 90 and 95%.

6.—The floor element according to any of the preceding items, wherein the intermediate space covers a central portion of the lower surface of the decorative layer leaving free a perimetral portion thereof.

7.—The floor element according to any of the preceding items, wherein the intermediate layer ha substantially the same shape of the decorative layer, for example the edges of the intermediate layer are substantially parallel to the edges of the decorative layer.

8.—The floor element according to any of the preceding items, wherein the intermediate layer has a substantially irregular shape.

10.—The floor element according to any of the preceding items, wherein the intermediate layer is configured to bond together the decorative layer and the support layer and/or improve the impact strength of the decorative layer.

11.—The floor element according to any of the preceding items, wherein the intermediate layer comprises an adhesive or a resin that bonds together the decorative layer and the support layer.

12.—The floor element according to any of the preceding items, wherein the intermediate layer comprises a resin and more preferably it is substantially made of that resin, for example, the resin is a thermosetting resin or thermoplastic resin.

13.—The floor element according to item 12, wherein the thermosetting resin are epoxy, polyurethane, unsaturated polyester, vinyl ester, cyanoacrylate.

14.—The floor element according to item 12, wherein thermoplastic resin are hot melt, polyester thermoplastic, acrylic resin, vinyl etc.

15.—The floor element according to any of the items from 12 to 14, wherein the resin comprises a viscosity less than 1000 Pas, preferably less than 800 Pas, more preferably less than 600 Pas, for example approximately 400 Pas at 20° C.; the resin has a viscosity greater than 1 Pas, and preferably greater than 10 Pas, for example greater than 100 Pas at 20° C.; e.g., the resin has a viscosity between 1 Pas and 1000 Pas at 20° C., including between 10 Pas and 1000 Pas at 20° C.

16.—The floor element according to any of the items from 12 to 15, wherein the resin is in a viscous state, for example in a pasty or gel state, in this case it can also show a thixotropic behavior.

17.—The floor element according to any of the items from 12 to 16, wherein the resin comprises a viscosity at 20° C. greater than 1000 Pas, preferably greater than 1200 Pas, more preferably greater than 1400 Pas, for example approximately 1500 Pas; The resin may have a viscosity greater than 1800 Pas, preferably greater 2000 Pas, for example 2200 Pas at 20° C., e.g., the resin may have a viscosity between 1000 Pas and 2200 Pas at 20° C., including between 1500 Pas and 2200 Pas at 20° C.

18.—The floor element according to any of the items from 12 to 17, wherein the resin shows a shrinkage, after curing, comprised between 0.5 and 15% for example between 1 and 10%. The inventors have surprisingly found that a resin showing this characteristic during its curing retires significantly.

19.—The floor element according to any of the items from 12 to 18, wherein the resin comprises a tensile strength between 50 and 90 MPa, more preferably between 60 and 80 MPa, for example 75 MPa.

20.—The floor element according to any of the items from 12 to 19, wherein the resin comprises a compressive strength between 90 and 130 MPa, more preferably between 100 and 120 MPa, for example 110 MPa.

21.—The floor element according to any of the items from 12 to 20, wherein the resin shows a hardness value of at least 50 measured on a Shore D scale.

22.—The floor element according to any of the items from 12 to 20, wherein the resin shows a hardness value less than 50 measured on a Shore D scale, and/or a tensile strength less than 50 MPa and/or a compressive strength less than 90 MPa.

23.—The floor element according to any of the items from 12 to 22, wherein the resin is provided onto the lower surface of the decorative layer in an amount greater than 100 g/sqm, more preferably greater than 250 g/sqm, for example 200 g/sqm.

26.—The floor element according to any of any of the preceding items, wherein the intermediate layer compresses the decorative layer.

25.—The floor element according to any of the items from 1 to 11, wherein the intermediate layer may comprise a metal plate, for example a steel or aluminum plate.

26.—The floor element according to item 25, wherein the metal plate is configured to establish a compressive state in the decorative layer.

27.—The floor element according to any of the items from 25 to 26, wherein the metal plate preferably compresses the decorative layer.

28.—The floor element according to any of the items from 25 to 27, wherein the metal plate has a coefficient of thermal expansion higher than the coefficient of thermal expansion of the decorative layer.

29.—The floor element according to any of the items from 25 to 28, wherein the metal plate preferably comprises a thickness less than 1 mm, for example less than 0.5 mm, more preferably less than 0.3 mm.

30.—The floor element according to any of the items from 25 to 29, wherein the metal plate has a thickness between 0.1 mm and 0.3 mm.

31.—The floor element according to any of the preceding items, wherein decorative layer can be made of any kind of hard or brittle material, such as ceramic, natural stone, concrete, glass or glass-ceramic material. Said brittle materials show high wear resistance, impermeability and cleanability.

32.—The floor element according to item 31, wherein the decorative layer comprises a ceramic body, for example made of porcelain, red body ceramic, stoneware, earthenware, or other sintered ceramic powders.

33. The floor element according to any of the preceding items, wherein the decorative layer comprises, at least in correspondence of its lower surface, an open porosity.

34.—The floor element according to any of the items from 31 to 33, wherein the decorative layer comprises an apparent porosity between 0.1% and 10% determined according to ASTM C373, more preferably between 2% and 8%, for example 6%.

35.—The floor element according to any of the preceding items, wherein the decorative layer comprises a lower surface that is substantially flat.

36.—The floor element according to any of the preceding items, wherein the lower surface of the decorative layer is free from backwash.

37.—The floor element according to any of the preceding items, wherein the decorative comprises a density, expressed by surface weight, of at least 10 kg/sqm, preferably 15 kg/sqm, for example greater than 19 kg/sqm.

38.—The floor element according to any of the preceding items, wherein the decorative layer comprises a density as expressed by surface weight of less than 35 kg/sqm, preferably less than 30 kg/sqm, for example less than 25 kg/sqm.

39.—The floor element according to any of the preceding items, wherein the cases where the decorative layer is formed unrectified tiles.

40.—The floor element according to any of the preceding items, wherein the decorative layer comprises rectified tiles.

41.—The floor element according to any of the preceding items, wherein the decorative layer has a thickness comprised between 4 and 15 mm, for example greater than 6 mm, preferably greater than 7 mm, for example about 8 or about 10 mm.

42.—The floor element according to any of the preceding items, wherein the decorative layer comprises a planarity deviation less than 1.5 mm, preferably less than 1 mm, even more preferably less than 0.8 mm.

43.—The floor element according to any of the preceding items, wherein the support layer is preferably made of a material adapted to be provided with coupling elements and/or made of a waterproof material and/or made of a compressible material.

44.—The floor element according to any of the preceding items, wherein the support layer is preferably made of a polymeric material, more preferably a thermoplastic polymeric material.

45.—The floor element according to item 44, wherein the thermoplastic material is PVC (polyvinyl chloride), polypropylene (PP) or polyurethane, more particularly thermoplastic polyurethane.

46.—The floor element according to any of items 44 and 45, wherein the thermoplastic material has a glass transition temperature (Tg) less than 100° C.

47.—The floor element according to any of the preceding items, wherein the support layer is made of PVC, more preferably either of a rigid or of a flexible PVC.

48.—The floor element according to any of the preceding items, wherein the support layer comprises a thermal expansion coefficient less than 85 µm/m per ° C., preferably less than 60 µm/m per ° C. for example 50 µm/m per ° C.

49.—The floor element according to any of the preceding items, wherein the thermal expansion coefficient of the support layer is comprised between 20 µm/m per ° C. and 85 µm/m per ° C., preferably between 40 µm/m per ° C. 60 µm/m per ° C.

50.—The floor element according to any of the preceding items, wherein the support layer comprises a flexural modulus between 1.5 and 3.5 GPa, for example, approximately 2.6 GPa.

51.—The floor element according to any of the preceding items, wherein the support layer comprises flexural strength between 60 and 90 MPa, for example approximately 76 MPa.

52.—The floor element according to any of the preceding items, wherein the support layer comprises a compressive strength between 40 and 70 MPa, for example approximately 56 MPa.

53.—The floor element according to any of the preceding items, wherein the support layer is formed of a plurality of separated elements, for example strips, or comprises grooves separating adjacent portions of the support layer thereby permitting the expansion of said portions without affecting the global stability of the floor.

54.—The floor element according to any of the preceding items, wherein the support layer comprises a thickness comprised between 2 and 7 mm, preferably less than 6 mm, more preferably about 4 mm or less.

55.—The floor element according to any of the preceding items, wherein the thickness of the floor element is less than 20 mm, preferably 18 mm or less, more preferably 13 mm or less.

56.—The floor element according to any of the preceding items, wherein the surface weight of the floor element is at least 18 kg/sqm, preferably at least 21 kg/sqm.

57.—The floor element according to any of the preceding items, wherein the floor element comprises a superficial area of less than 1.5 sqm, preferably less than 1 sqm, more preferably less than 0.4 sqm.

58.—The floor element according to any of the preceding items, wherein the floor element comprises an edge having a maximum length of less than 1.5 m, preferably less than 0.9 m.

59.—The floor element according to any of the preceding items, wherein the floor element comprises edges provided with coupling elements.

60.—The floor element according to item 59, wherein the coupling elements can be disposed substantially along the whole length of the related edge, for example, substantially defining the related edge.

61.—The floor element according to any of items from 59 to 60, wherein the coupling elements can be interrupted along the relative edge so that empty spaces are provided between subsequent portions of the coupling elements.

62.—The floor element according to any of items from 59 to 61, wherein the coupling elements are configured so that, in a coupled condition, the coupling is free from pretension.

63.—The floor element according to any of items from 59 to 62, wherein a play is established between the coupling elements so that tiny movements between the coupling elements in a vertical and/or horizontal direction are admitted.

64.—The floor element according to item 63, wherein said play is greater than 0.01 mm and less than 0.15 mm, more preferably said play is comprised between 0.03 and 0.1 mm.

65.—The floor element according to any of items from 59 to 64, wherein male and the female parts are shaped as a tongue and a groove.

66.—The floor element according to any of items from 59 to 65, wherein said coupling elements are at least partially, preferably entirely formed in said support layer.

67.—The floor element according to any of items from 59 to 66, wherein the coupling element are configured to allow herringbone installation.

68.—The floor element according to item 67, wherein the coupling elements are as described in application U.S. 62/862,850 which is hereby incorporated by reference.

69.—The floor element according any of the preceding items, wherein the support layer has a shape basically corresponding to the decorative layer, however, preferably, with one or more portions extending beyond the decorative layer.

70.—The floor element according any of the preceding items, wherein the decorative layer is mounted on the support layer in such a way that when the floor elements are in a coupled condition an intermediate distance is available between the edges of adjacent decorative layers, while the edges of the underlying support layer are coupled to each other by means of the available coupling elements.

71.—The floor element according any of the preceding items, that comprises at least a mark or indication to indicate how the floor elements shall be installed.

72.—The floor element according to item 71, wherein said marks can be provided on the edges of the floor element, preferably at least on the long edges.

73.—The floor element according to any of items from 71 to 72, wherein said mark is disposed at one third and/or at the half of the length of the edge.

74.—The floor element according to any of items from 71 to 73, wherein said mark is provided on only one of two opposite edge in order to identify that specific edge, for example that coupling element, for example the female part.

75.—The floor element according to any of items from 71 to 74, wherein said mark is provided only on the support layer or in general in a position that is destined to be hidden once installation is complete.

76.—The floor element according to any of items from 71 to 72, wherein said mark comprises a colored sign a symbol, preferably printed, and/or an incision and/or a relief.

77.—Floor covering comprising a plurality of floor element according to any of the preceding items.

78.—The floor covering according to item 77, wherein an intermediate distance is provided between at least the decorative edges of the floor elements, and comprising a grout at least partially filling said intermediate distance.

79.—The floor covering according to item 78, wherein the grout is polymeric and/or cement-based is used.

80.—The floor covering according to any of the items from 78 to 79, wherein the grout may be a flexible or rigid grout.

81.—The floor covering according to any of the items from 78 to 80, wherein the grout is silicone-based, epoxy-based, cement-based grout, polyurethane-based or acrylic-based grout.

82.—The floor covering according to any of the items from 78 to 81, wherein the grout shows a compressive strength greater than 20 MPa, for example comprised between 24 and 60 MPa.

83.—The floor covering according to any of the items from 78 to 82, wherein the grout shows an hardness Shore A of greater than 70, for example between 80 and 90.

84.—The floor covering according to any of the items from 77 to 83, wherein it comprises an underlayer disposed beneath the floor elements.

85.—The floor covering according to item 84, wherein the underlayer is made of a polymeric material, preferably a thermoplastic material.

86.—The floor covering according to any of the items from 84 to 85, wherein the underlayer is made of a compressible material, more preferably a foamed material.

87.—The floor covering according to any of the items from 84 to 86, wherein the underlayer is made of crosslinked polyolefin foam such as, for example, crosslinked polyethylene foam, or crosslinked polypropylene foam 88. The floor covering according to any of the items from 84 to 86, wherein the underlayer is made of other polymers, possibly foamed, like, for example, expanded polystyrene, rubber, polyurethane.

89.—The floor covering according to any of the items from 84 to 88, wherein the underlayer has a thickness less than 4 mm, for example less than 3 mm.

90.—The floor covering according to any of the items from 84 to 89, wherein the underlayer has a thickness greater than 1 mm, for example greater than 1.5 mm.

90.—The floor covering according to any of the items from 84 to 89, wherein the underlayer has a thickness comprised between 1 and 3 mm, preferably 2 mm.

91.—The floor covering according to any of the items from 84 to 90, wherein the underlayer has a compressive strength comprised between 50 and 500 kPa, at 0.5 deflection, measured according to ASTM D3575.

92.—The floor covering according to any of the items from 77 to 91, wherein the floor elements are disposed according to a regular flanked pattern wherein any floor element is flanked by only one adjacent floor element along a whole edge.

93.—The floor covering according to any of the items from 77 to 91, wherein the floor elements are disposed according to an offset pattern, for example a one third offset pattern or a 50/50 offset pattern.

94.—The floor covering according to any of the items from 77 to 91, wherein the floor elements are disposed according to a herringbone pattern.

95.—The floor covering according to any of the items from 77 to 94, wherein the floor elements are separated from a subsurface, for example the subfloor, i.e. they are not bonded to the subsurface by means of adhesive or mechanical means.

96.—A floor element comprising a decorative layer, a support layer provided with coupling elements on its edges wherein the coupling elements are configured to allow herringbone installation.

97.—The floor element according to item 96 wherein the decorative layer is a ceramic tile, or in general made of a brittle material.

98.—The floor element according to item 96 or 97, wherein the floor element is according to any of the item from 1 to 76.

99.—A floor element comprising a decorative layer, a support layer provided with coupling elements on its edges, wherein it comprises a mark identifying a specific edge and/or a specific position along an edge of the floor element.

100.—The floor element according to item 99 wherein the floor element is according to any of the item from 1 to 76.

101.—A floor covering comprising a plurality of floor elements wherein the floor elements comprise a decorative layer comprising a ceramic material, a support layer disposed below said decorative layer, wherein the floor elements further comprise coupling means configured to realize a mechanical coupling with coupling elements of adjacent floor elements, wherein the floor elements are disposed in a 50/50 offset pattern.

102.—The floor covering according to item 102 wherein the floor element is according to any of the item from 1 to 76.

103.—A floor covering comprising a plurality of floor elements wherein the floor elements comprise a decorative layer comprising a ceramic material, a support layer disposed below said decorative layer, wherein the floor elements further comprise coupling means configured to realize a mechanical coupling with coupling elements of adjacent floor elements, wherein the floor covering comprises at least an underlayer made of a compressible material.

104.—A floor covering according to item 103 wherein the floor element is according to any of the feature from 1 to 76.

What is claimed is:

1. A floor element for forming a floor covering comprising:
   a decorative layer comprising a ceramic tile or slab, the ceramic tile or slab comprising a lower surface that is substantially flat and free from relief structure;
   a support layer comprising rigid polyvinylchloride (PVC) and greater than 60 wt % of a filler; and
   an intermediate reinforcing layer consisting of a thermosetting resin, the intermediate layer disposed between and bonding together the decorative layer and the support layer, the intermediate layer improving the impact resistance of the decorative layer,
   wherein the floor element comprises edges provided with coupling elements adapted to cooperate with coupling elements of an adjacent similar floor element in the floor covering, the coupling elements configured to limit or prevent movement in the vertical direction and in the horizontal direction, and are configured such that a play between the coupling elements is established in the coupled condition,
   wherein the intermediate reinforcing layer further comprises at least one edge that is offset relative to a respective edge of the decorative layer and projects inwardly with respect to the respective edge of the decorative layer,
   wherein the intermediate reinforcing layer covers between 80% and 95% of the lower surface of the decorative layer,
   wherein the resin permeates an open porosity of the decorative layer and is provided on a lower surface of the decorative layer in an amount greater than 100 g/sqm,
   wherein the resin comprises unsaturated polyester, and
   wherein the resin has a tensile strength between 50 and 90 MPa.

2. The floor element according to claim 1, wherein the intermediate layer covers between 90% and 95% of the lower surface of the decorative layer.

3. The floor element according to claim 1, wherein the resin has a viscosity between 10 Pas and 1000 Pas at 20° C.

4. The floor element according to claim 1, wherein the resin has a viscosity between 1000 Pas and 2200 Pas at 20° C.

5. The floor element according to claim 1, wherein the resin has a tensile strength between 60 and 80 MPa.

6. The floor element according to claim 1, wherein the resin has a hardness value of at least 50 measured on a Shore D scale.

7. The floor element according to claim 1, wherein the support layer has a thermal expansion coefficient less than 85 μm/m per ° C.

8. The floor element according to claim 1, wherein the decorative layer is mounted on the support layer in such a way that when the floor elements are in a coupled condition, an intermediate distance is available between the edges of adjacent decorative layers.

9. A floor covering comprising:
   a plurality of adjacent floor elements comprising coupling means configured to enable a mechanical coupling with coupling elements of adjacent floor elements,
   wherein each floor element comprises:
      a decorative layer of ceramic material comprising a lower surface that is substantially flat and free from relief structure;
      a support layer disposed below the decorative layer and comprising rigid polyvinylchloride (PVC) and greater than 60 wt % of a filler; and
      an intermediate reinforcing layer consisting of a thermosetting resin, the intermediate reinforcing layer disposed between and bonding together the decorative layer and the support layer,
   wherein the intermediate reinforcing layer further comprises at least one edge that is offset relative to a respective edge of the decorative layer and projects inwardly with respect to the respective edge of the decorative layer, the intermediate layer improving the impact resistance of the decorative layer,
   wherein the intermediate layer covers between 80% and 95% of the lower surface of the decorative layer,
   wherein the floor covering further comprises a grout filling an intermediate distance separating the decorative layers of the adjacent floor elements,
   wherein the resin permeates an open porosity of the decorative layer and is provided on a lower surface of the decorative layer in an amount greater than 100 g/sqm,
   wherein the resin comprises unsaturated polyester,
   wherein the resin has a tensile strength between 50 and 90 Mpa, and
   wherein the coupling elements are configured to limit or prevent movement in the vertical direction and in the horizontal direction, and are configured such that a play between the coupling elements is established in the coupled condition.

10. The floor covering according to claim 9, wherein the grout at least partially fills an empty space between the decorative layer and the support layer.

11. The floor covering according to claim 9, wherein the grout is epoxy-based, silicone-based, polyurethane-based or acrylic-based grout.

12. The floor covering according to claim 9, wherein the grout has a compressive strength above 20 MPa and/or an hardness Shore A above 70.

13. A floor covering comprising:
   a plurality of adjacent floor elements comprising coupling means configured to enable a mechanical coupling with coupling elements of adjacent floor elements,
   wherein the floor elements comprise:
      a decorative layer comprising a ceramic material with a lower surface that is substantially flat and free from relief structure;
      a support layer disposed below the decorative layer and comprising rigid polyvinylchloride (PVC) and greater than 60 wt % of a filler;
      an intermediate layer reinforcing layer consisting of a thermosetting resin, the intermediate reinforcing layer disposed between and bonding together the decorative layer and the support layer, the intermediate layer improving the impact resistance of the decorative layer; and
      an underlayer made of a compressible material,
   wherein the intermediate layer further comprises at least one edge that is offset relative to a respective edge of the decorative layer and projects inwardly with respect to the respective edge of the decorative layer,
   wherein the intermediate layer covers between 80% and 95% of the lower surface of the decorative layer,
   wherein the resin permeates an open porosity of the decorative layer and is provided on a lower surface of the decorative layer in an amount greater than 100 g/sqm,
   wherein the resin comprises unsaturated polyester, wherein the resin has a tensile strength between 50 and 90 MPa, and
wherein the coupling elements are configured to limit or prevent movement in the vertical direction and in the horizontal direction, and are configured such that a play between the coupling elements is established in the coupled condition.

* * * * *